(12) United States Patent
Chung

(10) Patent No.: US 8,368,761 B2
(45) Date of Patent: Feb. 5, 2013

(54) IMAGE CORRECTION METHOD FOR CAMERA SYSTEM

(75) Inventor: Wung Chul Chung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 12/953,734

(22) Filed: Nov. 24, 2010

(65) Prior Publication Data

US 2011/0285856 A1    Nov. 24, 2011

(30) Foreign Application Priority Data

May 24, 2010  (KR) .................. 10-2010-0048081

(51) Int. Cl.
*H04N 17/00* (2006.01)

(52) U.S. Cl. ..... 348/175; 348/113; 348/148; 348/208.5; 348/180; 348/187; 340/932.2; 340/933; 340/937

(58) Field of Classification Search ............ 348/37–194, 348/222.1, 208.5; 396/50; 340/932.2, 933, 340/937; 382/104
See application file for complete search history.

(56) References Cited

U.S. PATENT DOCUMENTS 7,557,835 B2 *  7/2009  Douret et al. .............. 348/222.1

2008/0036857 A1 *  2/2008  Shimazaki .................. 348/113
2009/0010630 A1 *  1/2009  Higashibara et al. ........... 396/50

FOREIGN PATENT DOCUMENTS

KR        10-0948886 B1      3/2010

* cited by examiner

*Primary Examiner* — Sath V Perungavoor
*Assistant Examiner* — Nathnael Aynalem
(74) *Attorney, Agent, or Firm* — Edwards Wildman Palmer LLP; Peter F. Corless

(57) ABSTRACT

Disclosed herein is an image correction method for a camera system, which minimizes the amount of data that must be stored by a camera system and which can conveniently correct mounting errors of cameras. In the image correction method for a camera system, image data about a reference ground, which is captured by a camera and on which at least one ground mark is indicated, is acquired. Coordinates of a captured ground mark are obtained based on the image data. A preset Look-Up Table (LUT) is corrected using errors between the coordinates of the captured ground mark and coordinates of a preset reference mark. The ground mark and the reference mark may respectively have four or more corresponding correction points.

6 Claims, 11 Drawing Sheets

WHEN GROUND
GAZE ANGLE IS θ1

WHEN GROUND
GAZE ANGLE IS θ2

IMAGE CORRECTION METHOD FOR CAMERA SYSTEM

CROSS-REFERENCE TO RELATED APPLICATIONS

This application claims under 35 U.S.C. §119(a) priority to Korean Application No. 10-2010-0048081, filed on May 24, 2010, the disclosure of which is incorporated herein by reference in its entirety.

BACKGROUND OF THE INVENTION

1. Field of the Invention

The present invention relates, in general, to an image correction method for a camera system that can correct mounting errors of a camera caused when the camera is not accurately located in a desirable posture at a target location.

2. Description of the Related Art

In a camera system, in particular, a camera system which generates around views using one or more cameras, mounting error of the camera or cameras cause defects in around views, such as misalignments in images captured by the individual cameras.

In some vehicles, such a camera system is mounted to generate around views. One of the examples of the camera system is an Around View Monitor (AVM) system. Typically, the AVM system is tuned on the assumption that the cameras will be accurately arranged at planned locations and with planned postures (hereinafter simply referred to as "planned positions"). Such a tuning status does not retain its original quality after having passed along an actual mass production line of vehicles. This is due to mounting errors beyond tolerance that occur when the cameras are mounted on vehicles.

FIG. 1 illustrates an example of defects of an all-around view in an AVM system, due to the mounting errors of cameras. Such an AVM system generates an all-around view 6 including four images captured by four cameras mounted on the front, rear, left and right sides of a vehicle. Due to the mounting errors, optical axes of respective cameras deviate from their planned positions, thus resulting in misalignment sections 2 between the captured images of the cameras.

Many methods to eliminate the above-described defects have been proposed. One of the methods is to eliminate the defects on the basis of a software, as disclosed in U.S. Patent Application Publication No. 2009/0010630. This method is described briefly with reference to FIGS. 2 and 3.

As shown in FIG. 2, a vehicle 1, equipped with four cameras for an AVM system on the front, rear, left and right sides thereof in a vehicle mass production line, is located in a calibration area 3 in which four "+"-shaped ground marks 5 are drawn on a reference ground 4. The AVM system matches images captured by individual cameras with one another, and then outputs the images from the individual cameras or a combined all-around view 6 to the screen.

The four ground marks 5 are arranged at locations corresponding to those of the optical axes of the respective cameras when the four cameras are accurately mounted at planned positions. When, e.g., a front camera is moved from its planned position to the right and deviates clockwise due to mounting errors, the image captured by the front camera also deviates in the same way as that of the front camera, as shown in FIG. 3. In FIG. 3, a ground mark captured by the front camera, that is, a captured mark 7, is illustrated to be deviated to the right on the screen.

According to the above reference, the correction of defects attributable to the mounting errors of cameras is performed in such a way as to measure the horizontal error ($\Delta X$), the vertical error ($\Delta Y$) and the rotational error ($\Delta \theta$) of an optical axis, correct the vertical and horizontal errors of the optical axis, and correct the rotational error of the optical axis. Here, in particular, the correction of the rotational error is performed by selecting a map most suitable for the correction of the measured rotational error ($\Delta \theta$) from a plurality of maps previously provided depending on various rotational errors of the optical axis.

This method, however, requires a number of maps corresponding to the number of various cases as described above. As a result, the amount of data which must be stored by the AVM system may be excessively large.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention has been made keeping in mind the above problems occurring in the prior art, and an object of the present invention is to provide an image correction method for a camera system, which can minimize the amount of data that must be stored by the camera system and can conveniently correct mounting errors of cameras.

In order to accomplish the above object, the present invention provides an image correction method for a camera system, comprising a) acquiring image data about a reference ground which is captured by a camera and on which at least one ground mark is indicated; b) obtaining coordinates of a captured ground mark based on the image data acquired in a); and c) correcting a preset Look-Up Table (LUT) using errors between the coordinates of the captured ground mark, obtained in b), and coordinates of a preset reference mark.

Preferably, the ground mark and the reference mark may respectively have four or more corresponding correction points.

Preferably, the ground mark and the reference mark may respectively have four correction points arranged to correspond to vertices of a square or a rectangle.

Preferably, the captured ground mark and the reference mark may be displayed together on a screen, and information about coordinates of the correction points of the captured ground mark may be obtained from an external input.

Preferably, the correction points of the ground mark may be displayed as circles having a predetermined radius.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE EMBODIMENTS

Hereinafter, embodiments of an image correction method for a camera system according to the present invention will be described in detail with reference to the attached drawings.

Figure 1:
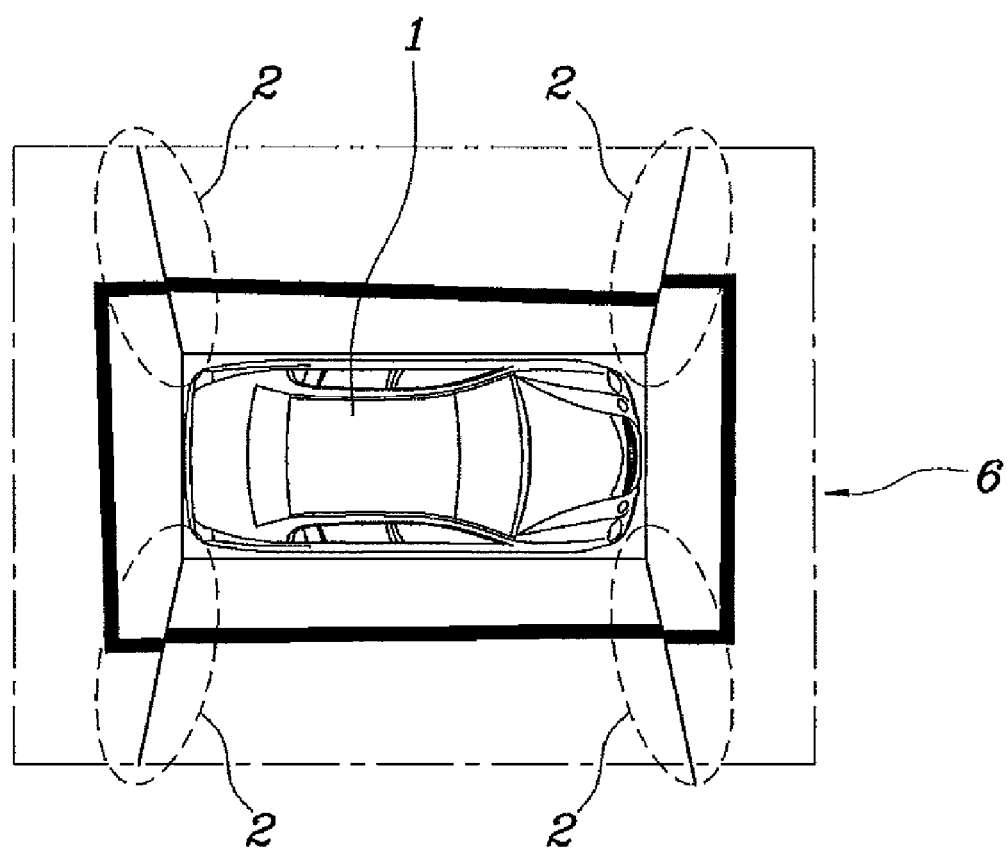
FIG. 1 is a diagram showing an example of defects in an all-around view attributable to mounting errors of cameras.
Figure 2:
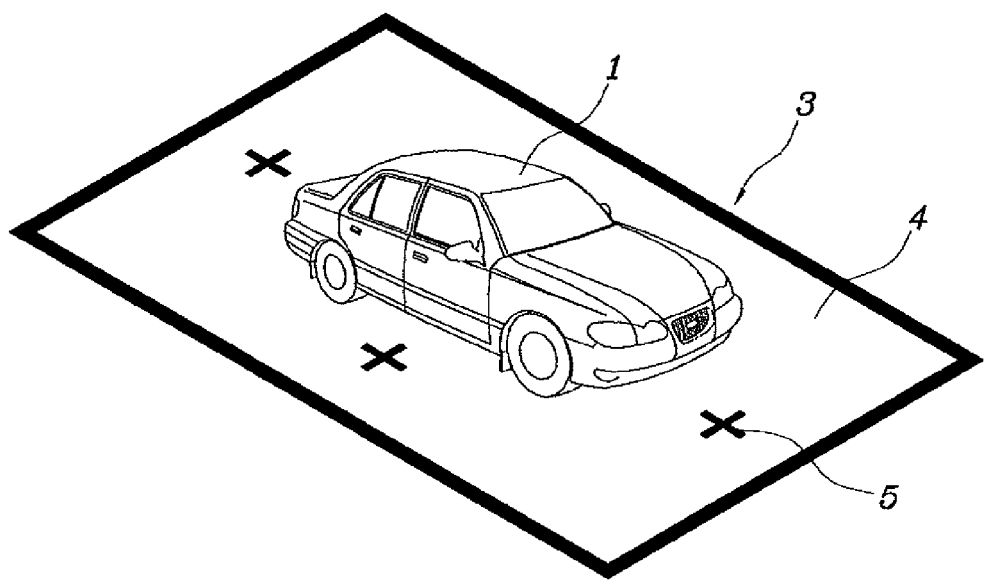
FIG. 2 is a diagram showing a conventional method of measuring mounting errors of cameras.
Figure 3:
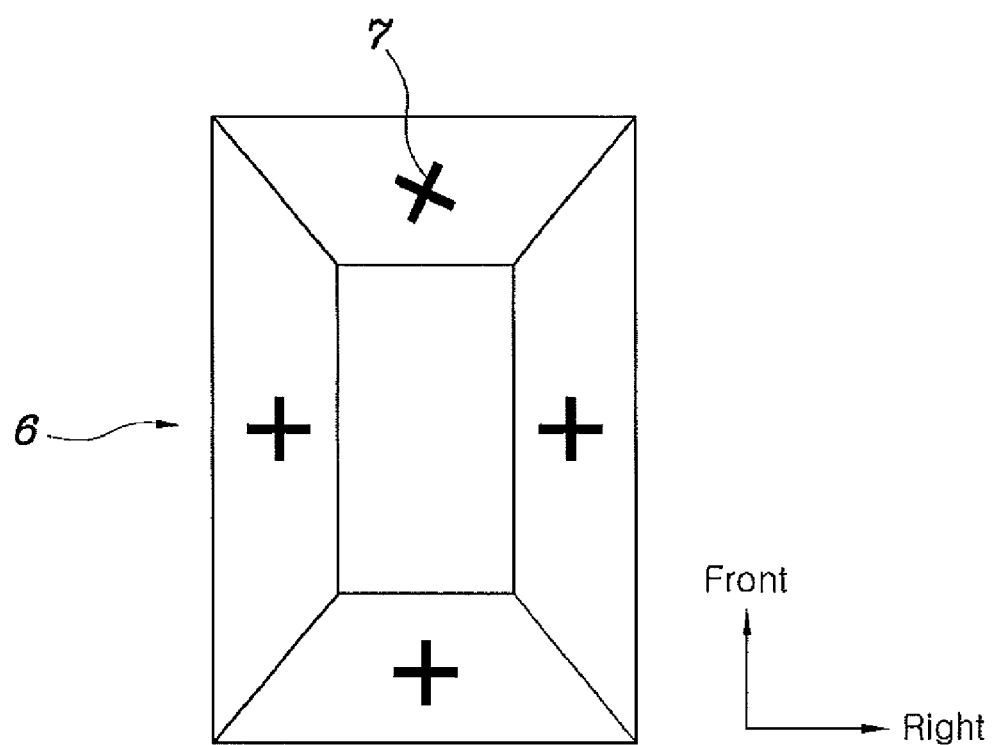
FIG. 3 is a diagram showing an example of an all-around view of the vehicle of FIG. 2, which shows the occurrence of an imbalance on the screen due to mounting errors of cameras.
Figure 4:
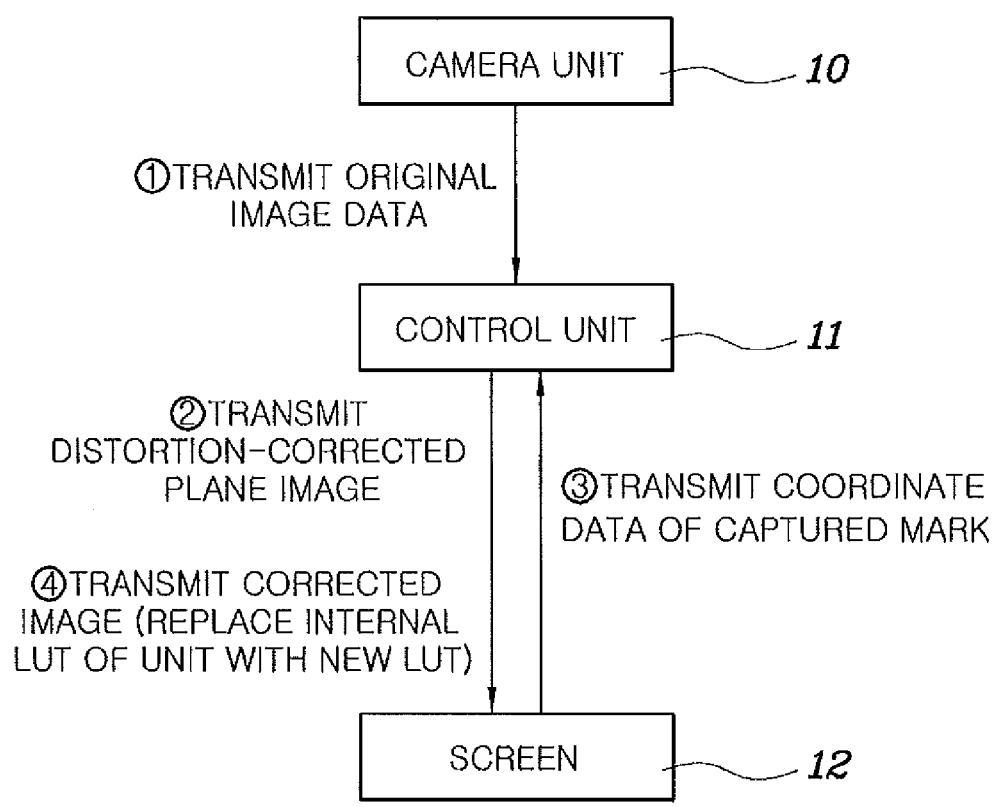
FIG. 4 is a diagram showing the flow of image correction performed by a camera system according to an embodiment of the present invention.

FIG. 4. illustrates a camera system and an image correction method according to the present invention. The camera system includes a camera unit 10, a control unit 11, and a screen 12. The camera unit 10 can be realized by any type of cameras (e.g., wide-angle cameras) that can provide around views. The camera unit 10 may include four cameras that are mounted on the front, rear, left and right sides of a vehicle.

When original image signal data is received from the four cameras, the control unit 11 corrects distortion of images captured by the individual cameras 10, generates plane images from the distorted images, matches the generated plane images with one another, and outputs the matched images to the screen 12. It is apparent that individual plane images, as well as an all-around view in which the plane images are combined with one another, can be output to the screen 12.

One of the characteristics of the image correction method according to the present embodiment is that when there are mounting errors of cameras, a preset Look Up Table (LUT) is either replaced with a new LUT or updated so as to convert three-dimensional coordinates of the original image picked up by each camera into two-dimensional coordinates, that is, so as to correct distortion from the original image picked up by the respective camera and output the plane image to the screen 12. In other words, the control unit 11 calculates the amount of correction depending on the movement and the amount of rotation of each optical axis, and then generates new the optical axis detection values of the camera 10, stored in the control unit 11.

In some conventional systems, any single suitable map is selected from a plurality of preset maps, and the mounting errors of cameras are corrected based on the selected map. In this case, since the amount of possible unit correction is preset, the correction of the mounting errors of the cameras is not precise, and a large amount of data must be unnecessarily stored. For the purpose of simplicity, the case where correction must be inevitably performed by 5° at each time by using the preset map (that is, the case where the amount of unit correction using the map is 5°), although the required error correction is 2°, is assumed. In this case, there are problems in that error correction is not precise and a plurality of maps must be unnecessarily stored. As detailed below, these problems do not involve in the present invention.

An image correction method according to an embodiment of the present invention will be described in detail with reference to FIGS. 4 to 11.

First, a process for measuring mounting errors of cameras will be described in detail with reference to FIGS. 5 to 9.

Figure 5:
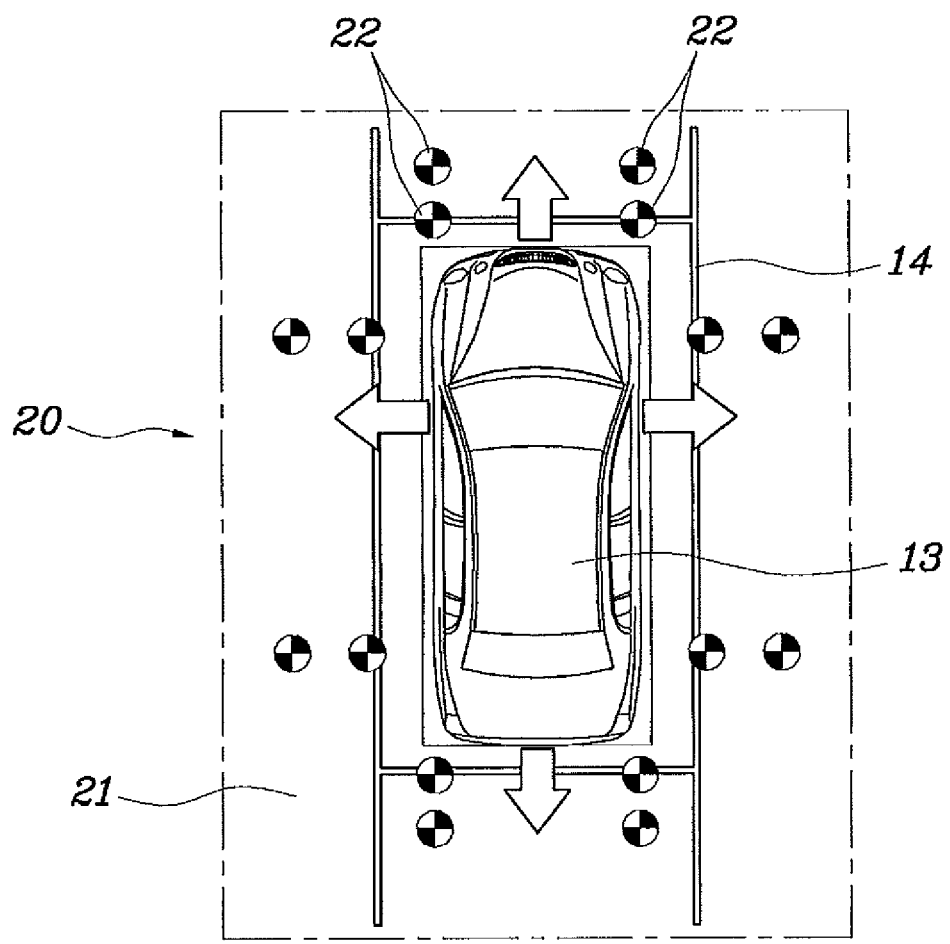
FIG. 5 is a diagram showing a method of measuring mounting errors of cameras according to an embodiment of the present invention.

Referring to FIG. 5, a vehicle 13 newly equipped with four cameras 10 in a mass production line is placed in a calibration area 20. Ground marks 22, formed such that points corresponding to the locations of four vertices of a rectangle (hereinafter referred to as "correction points") are placed, are drawn in the reference ground 21 of the calibration area 20. The ground marks 22 are arranged as four groups in the front, rear, left and right directions of the vehicle to correspond to the four cameras 10. Reference numeral 14 denotes a parking line.

Figure 6:
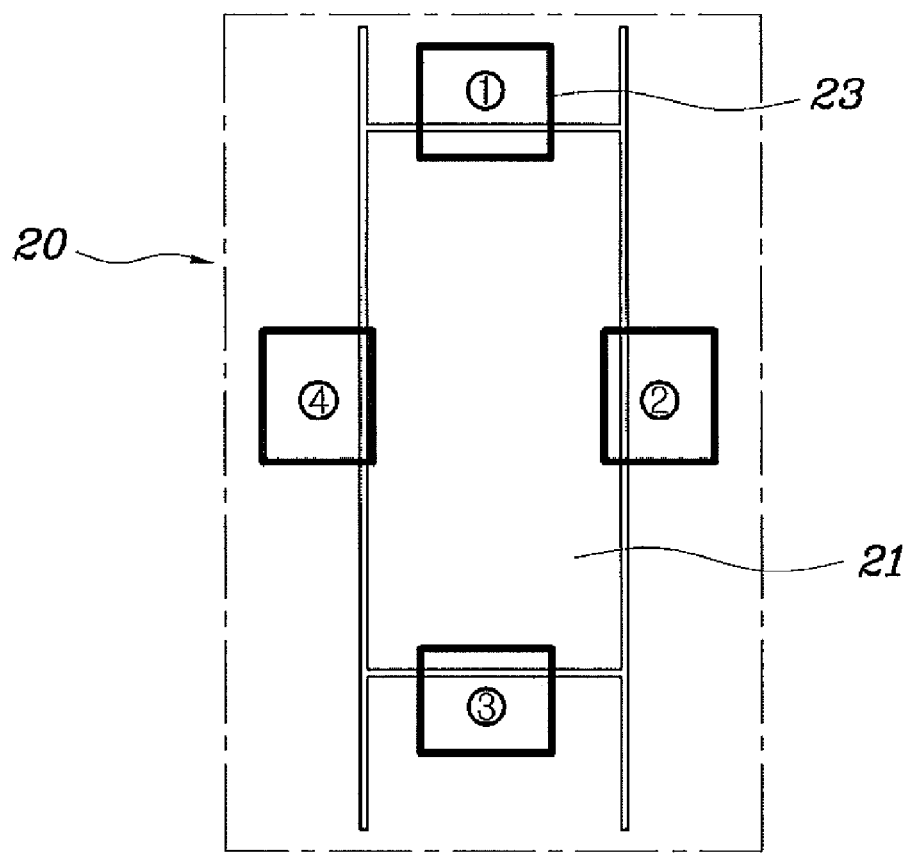
FIG. 6 is a diagram showing a method of measuring mounting errors of cameras according to another embodiment of the present invention.

According to another embodiment, rectangular ground marks 23, each having vertices and lines, can also be used, as shown in FIG. 6. These ground marks 23 are identical to the ground marks 22 shown in FIG. 5 in that each of the ground marks 23 has four correction points compared to the ground marks 22. That is, individual vertices of each rectangular ground mark 23 correspond to the four correction points.

One of the reasons for using four correction points to correct the mounting errors of cameras is that the time and the amount of data required for image conversion must be taken into consideration. As the number of correction points increases, the degree of distortion correction is improved. However, as the number of correction points increases, a larger space for image correction is required, and the required time also increases. There is a need to select the optimal number of correction points for image correction. According to the embodiment, four or more correction points, preferably, four correction points, are required.

Figure 7:
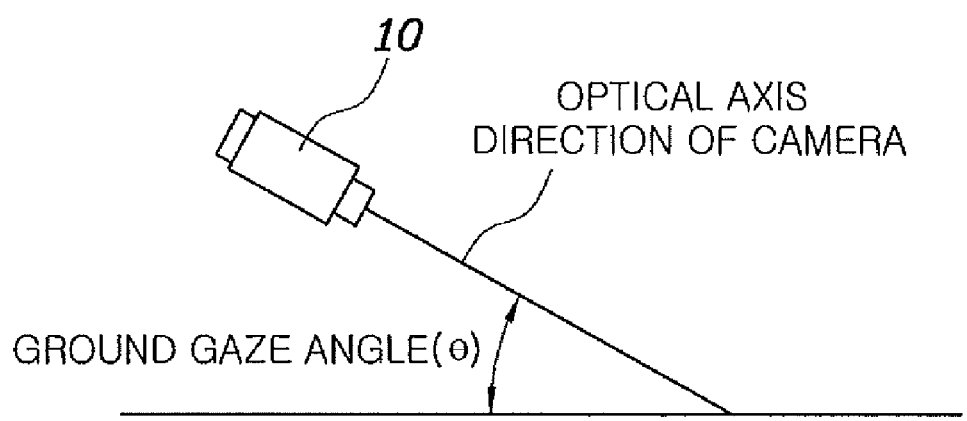
FIG. 7 is a diagram showing the ground gaze angle of a camera.
Figure 8A:
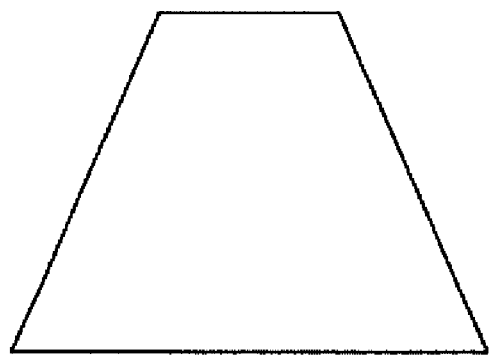
FIGS. 8A and 8B are diagrams showing the degrees of image distortion depending on the ground gaze angles of a camera, where $\theta 1 < \theta 2$.
Figure 8B:
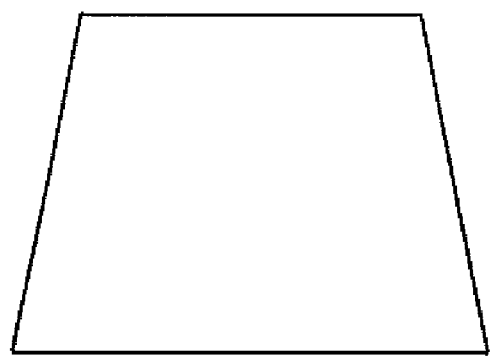

Referring to FIG. 7, another reason for using four or more correction points is the ground gaze angle θ of each camera corresponding to the slope of the optical axis of the respective cameras relative to the ground. As an example, as shown in FIGS. 8A and 8B, when there is a condition of the ground gaze angles $\theta 1 < \theta 2$, the degree of distortion at the ground gaze angle θ1 is larger than that at the ground gaze angle θ2. In order to correct distortions depending on such ground gaze angles, four or more correction points, preferably, four correction points arranged to correspond to the vertices of a square or a rectangle, are required. Meanwhile, according to the present embodiment, the processing of camera images is performed by perspective transformation.

Hereinafter, an image correction method using the rectangular ground marks 23 of FIG. 6 will be described in detail for the convenience of description.

Figure 9:
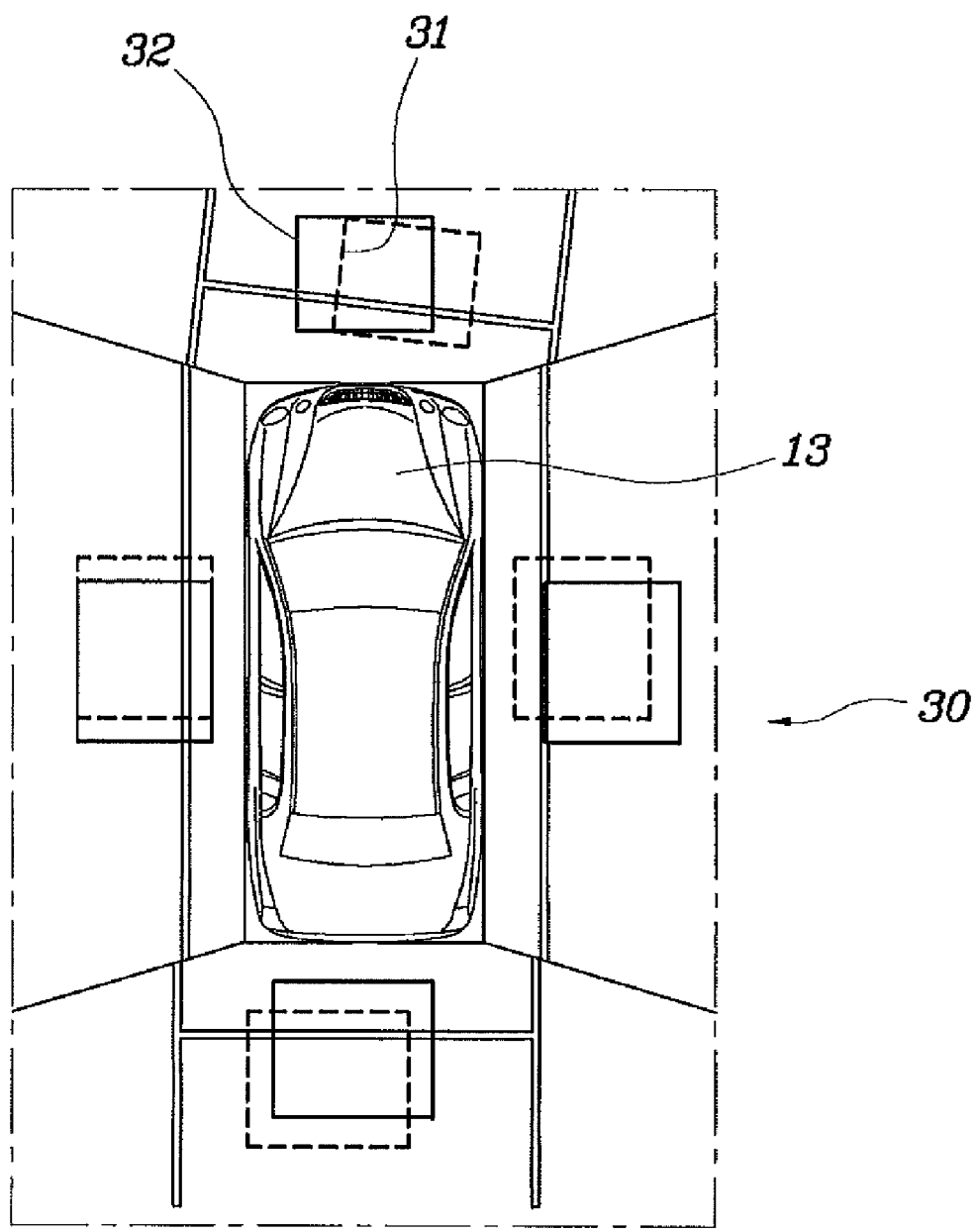
FIG. 9 is a diagram showing an example of an all-around view of FIG. 6.
Figure 10:
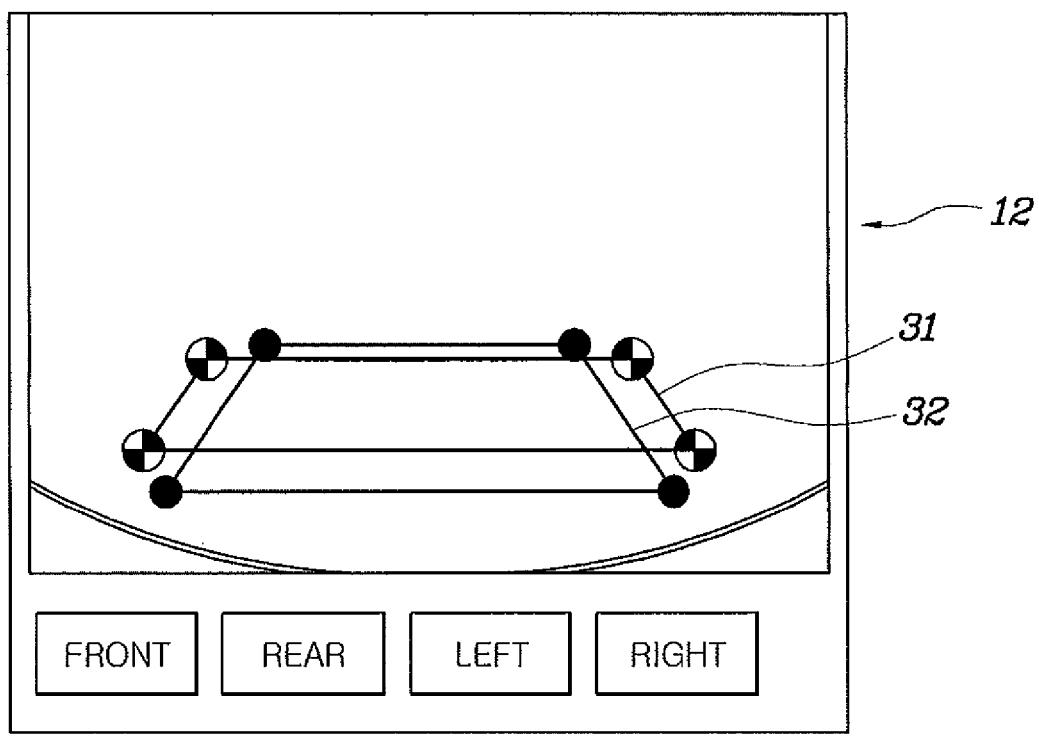
FIG. 10 is a diagram showing a front image captured by the front camera shown in FIG. 6.

Referring to FIGS. 4 and 9, when a vehicle equipped with cameras is located at a suitable location in a calibration area 20, an evaluator turns on a camera system. As the camera system is turned on, the original image signal data is transferred from the cameras to the control unit 11. The control unit 11 corrects image distortion from the original image signal data, matches the images captured by the individual cameras with one another using a preset LUT, and then outputs a required captured image 30 to the screen 12.

The captured image includes both captured marks 31 which are obtained by capturing ground marks 23, and reference marks 32 which are preset and displayed on the screen 12. These reference marks 32 are preset to correspond to the captured marks in the case where the cameras 10 are tuned normally.

When the cameras are located normally in accurate postures at their design locations, the captured marks 31 are accurately aligned with the reference marks 32. However, when the optical axes of the cameras deviate from their planned positions due to the mounting errors of the cameras, the captured marks 31 are not accurately aligned with the reference marks 32, as shown in FIG. 9.

Next, the process of correcting mounting errors of a front camera will be described in detail with reference to FIGS. 4 to 10.

As shown in FIGS. 4 to 10, when a misalignment between a captured mark 31 and a reference mark 32 occurs in an image captured by the front camera, the coordinates of each of four correction points of the captured mark 31 are transmitted to the control unit 11 if the evaluator touches the four correction points. The control unit 11 corrects the misalignment using those coordinates, and outputs the corrected image to the screen 12. In this case, the screen 12 may be realized by a touch screen.

The generation of the corrected image is performed by replacing an LUT previously stored in the control unit 11 with a new LUT. This replacement can be achieved by calculating the amount of correction depending on the rotation and movement of the camera on the basis of the coordinates of the correction points of the captured mark 31 and the coordinates of the correction points of the reference mark 32.

Both formulas, used at the time of initially setting the LUT used for that calculation, and a variety of other formulas can be used.

The maximum correction range of the mounting errors of cameras according to the present embodiment will be described with reference to FIG. 11.

Since the image correction method for the camera system according to the present invention corrects the mounting errors of cameras on the basis of software, the limits of such a correction range are present.

When the mounting errors of cameras are greater than the limits, it is preferable to physically adjust the locations and/or postures of the cameras. According to an embodiment of the present invention, the camera system is configured such that the maximum error correction range can be checked on the screen 12.

Figure 11:
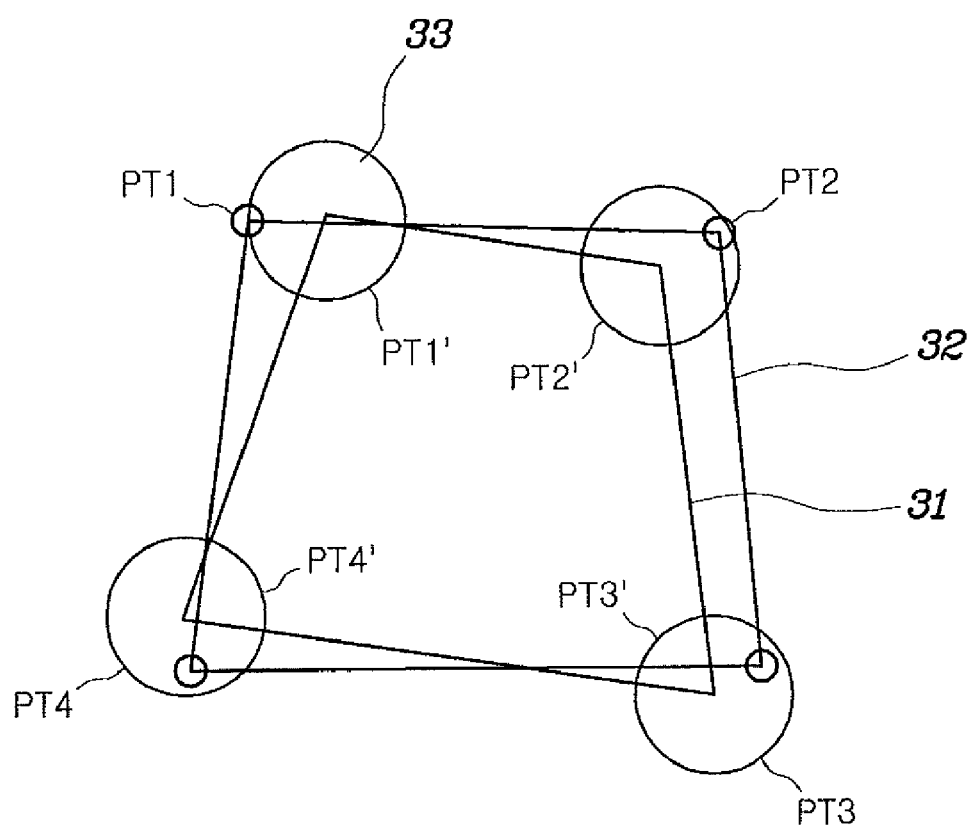
FIG. 11 is a diagram showing the range of correction of the mounting errors of cameras according to an embodiment of the present invention.

As shown in FIG. 11, the correction points PT1', PT2', PT3' and PT4' of a captured mark 31 (that is, the correction points of the ground mark) are displayed as circles having a predetermined radius on the screen 12 of the camera system, and the correction points PT1, PT2, PT3, and PT4 of a reference mark 32 are displayed as dots smaller than the circles 33.

When the correction points PT1, PT2, PT3, and PT4 of the reference mark 32 are respectively present within the circles 33 at locations corresponding thereto, the reliability of software-based error correction is high; otherwise physical error correction is required.

The circles 33 indicate the maximum reliable correction range of the mounting errors of cameras. Unlike in the above embodiment, the correction points PT1, PT2, PT3, and PT4 of the reference mark 32 may be displayed as circles having a predetermined radius, and the correction points PT1', PT2', PT3', and PT4' of the captured mark 31 may be displayed as dots.

As described above, the individual correction points of each ground mark 22 or 23 are displayed as circles having a predetermined radius, so that the evaluator can personally check the limitation of software-based error correction, thus not only improving convenience but also guaranteeing the reliability of correcting the mounting errors of cameras.

According to the above-described image correction method for a camera system, separate map data is not required, and thus the amount of data required to be stored by the camera system can be minimized, and the correction of the mounting errors of cameras can be conveniently performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image correction method for a camera system, comprising:
    a) acquiring image data about a reference ground mark which is captured by a camera and on which at least one ground mark is indicated;
    b) obtaining coordinates of a captured ground mark based on the image data acquired in a);
    c) displaying both the captured ground mark and the reference ground mark on a display unit, wherein the reference ground mark is preset and the captured ground mark is captured by the camera; and
    d) in response to a driver selecting the captured ground mark, transmitting one or more coordinates associated with the captured ground mark to a control unit, correcting by the control unit any misalignment of those coordinates with the reference ground mark and replacing, by the control unit, a preset Look-Up Table (LUT) with a new LUT based on errors identified by the control unit between coordinates of the captured ground mark and coordinates of a preset reference mark, wherein new LUT is replaced by calculating an amount of correction depending on a movement and an amount of rotation of each optical axis of the camera, and then generates new optical axis detection values for the camera.

2. The image correction method according to claim 1, wherein the ground mark and the reference mark respectively have four or more corresponding correction points.

3. The image correction method according to claim 1, wherein the ground mark and the reference mark respectively have four correction points arranged to correspond to vertices of a square or a rectangle.

4. The image correction method according to claim 2, wherein the captured ground mark and the reference mark are displayed together on a screen, and information about coordinates of the correction points of the captured ground mark is obtained from an external input.

5. The image correction method according to claim 3, wherein the captured ground mark and the reference mark are displayed together on a screen, and information about coordinates of the correction points of the captured ground mark is obtained from an external input.

6. The image correction method according to claim 3, wherein the correction points of the ground mark are displayed as circles having a predetermined radius.

* * * * *